United States Patent
Vallath et al.

(10) Patent No.: US 9,686,740 B2
(45) Date of Patent: Jun. 20, 2017

(54) SYSTEMS AND METHODS FOR INTELLIGENT FREQUENCY SELECTION IN CARRIER AGGREGATION ENABLED NETWORKS

(71) Applicant: APPLE INC., Cupertino, CA (US)

(72) Inventors: Sreevalsan Vallath, Dublin, CA (US); Deepankar Bhattacharjee, Cupertino, CA (US); Navid Damji, Cupertino, CA (US); Christian W. Mucke, Sunnyvale, CA (US); Rafael L. Rivera-Barreto, Santa Clara, CA (US); Tarik Tabet, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 78 days.

(21) Appl. No.: 14/536,371

(22) Filed: Nov. 7, 2014

(65) Prior Publication Data
US 2015/0173009 A1 Jun. 18, 2015
US 2016/0044589 A9 Feb. 11, 2016

Related U.S. Application Data

(60) Provisional application No. 61/901,327, filed on Nov. 7, 2013.

(51) Int. Cl.
*H04W 48/18* (2009.01)
*H04L 5/00* (2006.01)
*H04W 48/20* (2009.01)

(52) U.S. Cl.
CPC ............. *H04W 48/18* (2013.01); *H04L 5/001* (2013.01); *H04W 48/20* (2013.01)

(58) Field of Classification Search
CPC ........ H04W 48/18; H04W 48/20; H04L 5/001
USPC .......................... 370/281, 329, 252, 328, 469
See application file for complete search history.

(56) References Cited

U.S. PATENT DOCUMENTS

| 2013/0114398 | A1* | 5/2013 | Wang | H04W 76/048 370/221 |
| 2013/0114554 | A1* | 5/2013 | Yang | H04W 24/10 370/329 |
| 2013/0279446 | A1* | 10/2013 | Lv | H04L 5/001 370/329 |
| 2015/0016323 | A1* | 1/2015 | Sundararajan | H04W 52/0209 370/311 |
| 2015/0237514 | A1* | 8/2015 | Maeda | H04W 24/02 370/338 |

* cited by examiner

*Primary Examiner* — Duc C Ho
(74) *Attorney, Agent, or Firm* — Fay Kaplan & Marcin, LLP

(57) ABSTRACT

Systems and methods that enhance radio link performance in a multi-carrier environment. A method may be performed by a UE that includes scanning a plurality of carrier components for a primary cell, determining a first bandwidth of the primary cell, scanning for a secondary cell, determining a second bandwidth of the secondary cell, determining a maximum aggregated bandwidth by combining the first bandwidth and the second bandwidth and when the maximum aggregated bandwidth exceeds a bandwidth capability of the UE, performing a cell selection procedure to select one of the primary cell or the secondary cell based on a higher of the first bandwidth and the second bandwidth.

20 Claims, 7 Drawing Sheets

Fig. 1

Table 100

| CA Configuration | E-UTRA Bands | CA operating / Channel bandwidth | | | | | | Maximum aggregated bandwidth [MHz] | Bandwidth combination set |
|---|---|---|---|---|---|---|---|---|---|
| | | 1.4 MHz | 3 MHz | 5 MHz | 10 MHz | 15 MHz | 20 MHz | | |
| CA_1A-5A | 1 | | | | Yes | | | 20 | 0 |
| | 5 | | | | Yes | | | | |
| CA_1A-18A | 1 | | | Yes | Yes | Yes | Yes | | |
| | 18 | | | Yes | Yes | Yes | | | |
| CA_1A-19A | 1 | | | Yes | Yes | Yes | Yes | 35 | 0 |
| | 19 | | | Yes | Yes | Yes | | | |
| CA_1A-21A | 1 | | | Yes | Yes | Yes | Yes | | |
| | 21 | | | Yes | Yes | Yes | | | |
| CA_2A-17A | 2 | | | Yes | Yes | | | | |
| | 17 | | | Yes | Yes | | | | |
| CA_3A-5A | 3 | | | | Yes | Yes | Yes | 30 | 0 |
| | 5 | | | Yes | Yes | | | | |
| | 3 | | | | Yes | | | 20 | 1 |
| | 5 | | | Yes | Yes | | | | |
| CA_3A-7A | 3 | | | Yes | Yes | Yes | Yes | | |
| | 7 | | | | Yes | Yes | Yes | | |
| CA_3A-20A | 3 | | | Yes | Yes | Yes | Yes | | |
| | 20 | | | Yes | Yes | | | | |
| CA_4A-12A | 4 | Yes | Yes | Yes | Yes | | | | |
| | 12 | | | Yes | Yes | | | | |
| CA_4A-13A | 4 | | | Yes | Yes | Yes | Yes | | |
| | 13 | | | | Yes | | | | |
| CA_4A-17A | 4 | | | Yes | Yes | | | 20 | 0 |
| | 17 | | | Yes | Yes | | | | |
| CA_7A-20A | 7 | | | | Yes | Yes | Yes | | |
| | 20 | | | Yes | Yes | | | | |

NOTE 1: The CA Configuration refers to a combination of an operating band and a CA bandwidth class specified in Table 5.6A-1 (the indexing letter). Absence of a CA bandwidth class for an operating band implies support of all classes.
NOTE 2: For each band combination, all combinations of indicated bandwidths belong to the set
NOTE 3: For the supported CC bandwidth combinations, the CC downlink and uplink bandwidths are equal Prior Art Prior Art

SYSTEMS AND METHODS FOR INTELLIGENT FREQUENCY SELECTION IN CARRIER AGGREGATION ENABLED NETWORKS

PRIORITY CLAIM/INCORPORATION BY REFERENCE

This application claims priority to U.S. Provisional Application 61/901,327 entitled "Systems and Methods for Intelligent Frequency Selection in Carrier Aggregation Enabled Networks," filed on Nov. 7, 2013, the entirety of which is incorporated herein by reference.

BACKGROUND

Long-term evolution ("LTE") is a wireless communication standard used for high-speed data for mobile devices and data terminals. LTE-Advanced is a major enhancement to the LTE standard. Within the LTE-Advanced standard, carrier aggregation is used to increase the bandwidth, and thereby increase the bitrates. Carrier aggregation was introduced in the 3rd Generation Partnership Project ("3GPP") Release 10 (LTE-Advanced standard) and has been carried through to later Releases to provide wider than 20 MHz transmission bandwidth to a single device (e.g., user equipment or "UE") while maintaining the backward compatibility with legacy UEs. Specifically, carrier aggregation may be defined as the aggregation of two or more component carriers to support wider transmission bandwidths.

Carrier aggregation configuration may be defined as a combination of carrier aggregation operating bands, each supporting a carrier aggregation bandwidth class by a UE. The bandwidth class may be defined by the aggregated transmission bandwidth configuration and maximum number of component carriers supported by a UE. For intra-band contiguous carrier aggregation, a carrier configuration may be a single operating band supporting a carrier aggregation bandwidth class. For each carrier aggregation configuration, requirements may be specified for all bandwidth combinations contained within a bandwidth combination set, as indicated by the radio access capabilities of the UE. Accordingly, a UE may indicate support of several bandwidth combination sets for each band combination. FIG. 1 shows an exemplary table 100 including the requirements for inter-band aggregation as defined for the carrier aggregation configurations and bandwidth combination sets.

Under the current LTE standards, each aggregated carrier is referred to as a component carrier, and each component carrier can have a bandwidth of 1.4, 3, 5, 10, 15 or 20 MHz and a maximum of five component carriers can be aggregated. As illustrated in FIG. 2, two exemplary component carriers may each have a bandwidth of 10 MHz to combine for a total bandwidth of 20 MHz. With carrier aggregation features enabled, the LTE-Advanced standard device supporting 20 MHz carrier aggregation may achieve downlink ("DL") throughput of 100 Mbps.

It is possible for a UE utilizing carrier aggregation configuration to support an aggregate maximum bandwidth greater than the capabilities of the device. In other words, a UE limited to a certain bandwidth threshold may have component carriers exceeding that limitation through carrier aggregation. Accordingly, there may be scenarios in which the UE is allocated resources to a carrier components not necessarily having the highest available bandwidth within the UE's capabilities.

SUMMARY

Described herein are systems and methods to enhance radio link performance in a multi-carrier environment. A method may be performed by a UE that includes scanning a plurality of carrier components for a primary cell, determining a first bandwidth of the primary cell, scanning for a secondary cell, determining a second bandwidth of the secondary cell, determining a maximum aggregated bandwidth by combining the first bandwidth and the second bandwidth and when the maximum aggregated bandwidth exceeds a bandwidth capability of the UE, performing a cell selection procedure to select one of the primary cell or the secondary cell based on a higher of the first bandwidth and the second bandwidth.

Further described herein is another method that may be performed by a UE that includes attaching to a primary cell within a network, sending an advertisement message indicating that the UE does not support operating band combinations of the primary cell, determining a first bandwidth of the primary cell, and scanning for a secondary cell within the network that meets a predetermined criteria. When the secondary cell meets the predetermined criteria, the method further includes determining a second bandwidth for the secondary cell, and determining a maximum aggregated bandwidth by combining the first bandwidth and the second bandwidth. When the maximum aggregated bandwidth exceeds a bandwidth capability of the UE, the method further includes determining one of the primary cell or the secondary cell that has a higher of the first bandwidth and the second bandwidth, and storing information indicating the one of the primary cell or the secondary cell that has a higher of the first bandwidth and the second bandwidth.

Further described herein is a method that may be performed by a network component such as a network server that includes determining which of a primary cell and secondary cell within a carrier aggregation pair of a network has a higher priority based on bandwidth capabilities for each of the primary cell and the secondary cell and configuring the primary cell and the secondary cell of the carrier aggregation pair such that the higher bandwidth cell in the pair is designated as a higher priority cell.

DESCRIPTION OF THE DRAWINGS

FIG. 1 (discussed above) shows a table listing carrier aggregation configurations and bandwidth combination sets.

DETAILED DESCRIPTION

Figure 2:
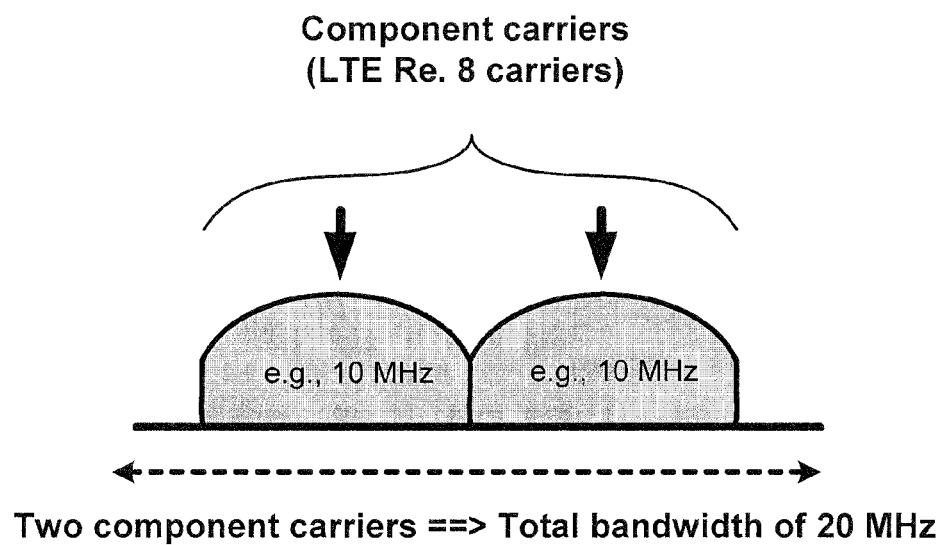
FIG. 2 (discussed above) shows an example of carrier aggregation including two component carriers each having a bandwidth of 10 MHz for a total bandwidth of 20 MHz.

The exemplary embodiments may be further understood with reference to the following description and the appended drawings, wherein like elements are referred to with the same reference numerals. The exemplary embodiments show systems and methods for intelligent frequency selection in carrier aggregation enabled networks. More specifically, the exemplary embodiments described herein may allow for the selection of a frequency based on a bandwidth combination used by a UE and thus, optimize throughput and performance of the UE.

When carrier aggregation is used, there may be a number of serving cells for each of the component carriers. The coverage of the serving cells may differ due to both component carrier frequencies and power planning, which is useful for heterogeneous network planning. A radio resource control ("RRC") connection is handled by one cell, namely the primary serving cell ("PCell"), served by the primary component carrier ("PCC") for uplink ("UL") and downlink ("DL").

The other component carriers may be referred to as secondary component carriers ("SCC") for UL and DL, serving the secondary serving cells ("SCells"). The SCCs are added and removed as required, while the PCC is changed at handover. Those skilled in the art will understand that the PCell and SCells are logical constructs allowing for the addition of SCells as needed. The PCell is the main cell that is used for all RRC signaling and control procedures, while the SCell is considered an augmentation to the PCell.

Figure 3:
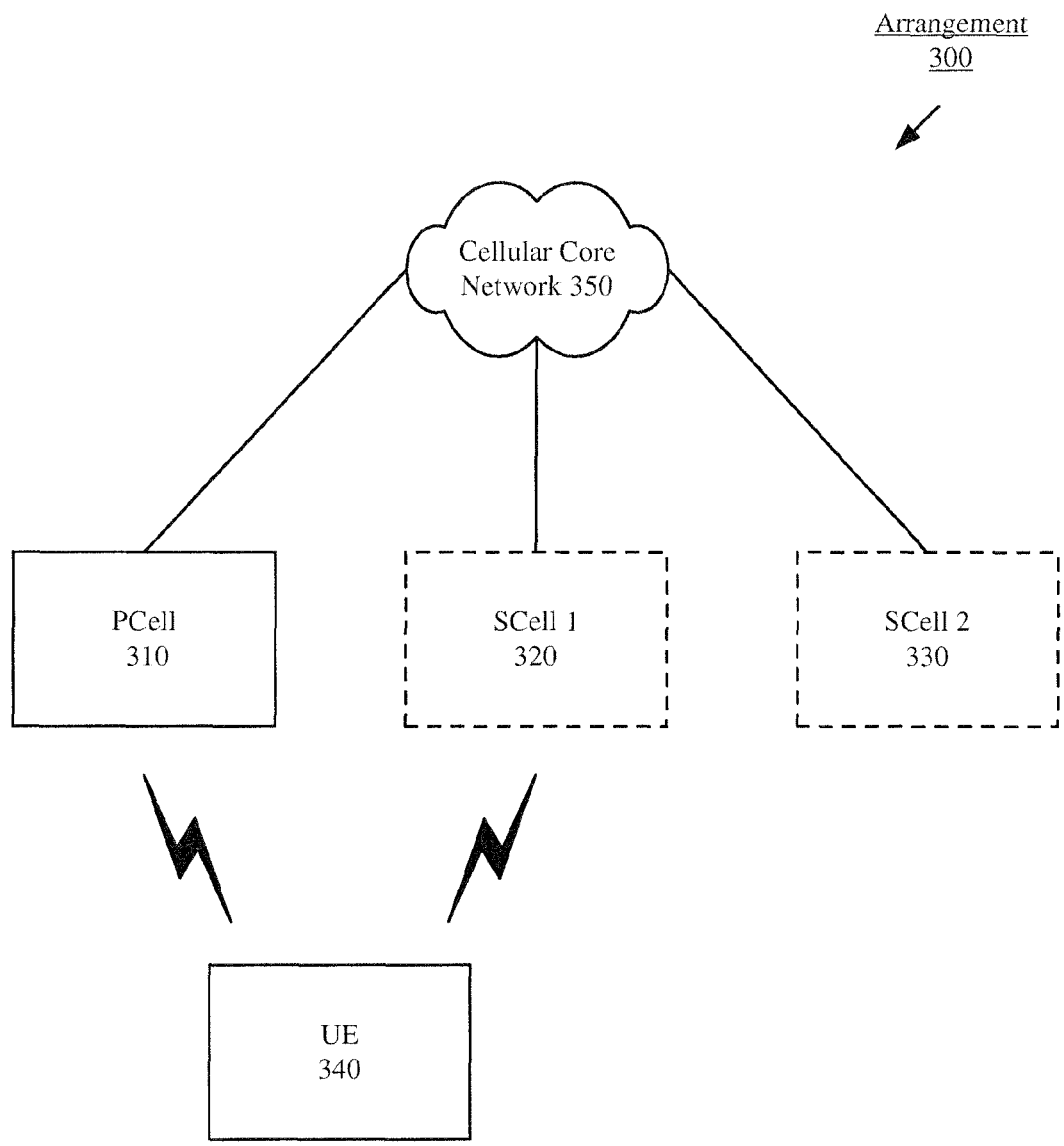
FIG. 3 shows an exemplary arrangement including a UE, a PCell and two SCells.

FIG. 3 shows an exemplary arrangement 300 including a UE 340, a PCell 310 and two SCells 320 and 330. The PCell 310 and the SCells 320 and 330 are further connected to a cellular core network 350. The cellular core network 350 may include various components and logical structures that are used to implement the cellular network (e.g., a Mobile Management Entity (MME), a serving gateway (SG), a PDN Gateway (PGW), etc.). The PCell 310, the SCells 320 and 330 and the cellular core network 350 are generally components controlled by the cellular network provider (e.g., Verizon, AT&T, Sprint, T-Mobile, etc.). This skilled in the art will understand that a cellular network may have thousands of cells that are distributed over a service area of the cellular network and the inclusion of three cells in FIG. 3 is only exemplary.

In this example, it may be considered that the UE 340 is currently connected to the PCell 310 and the SCell 320. The SCells 320 and 330 are shown in phantom because, as described above, these SCells may be added and removed as required. Thus, while the arrangement 300 shows the SCell 320 connected to the UE 340, it may be that at a later time it is determined that SCell 320 is no longer needed, leaving only PCell 310 being connected to the UE 340. Such a determination may be made based on the throughput requirements that are needed for UL or DL for the UE 340. In another example, it may be considered that the UE 340 has a higher UL or DL throughput requirement and therefore, an SCell connection needs to be added. In this case, the SCell 330 may be connected to the UE 340, resulting in PCell 310 and SCell 330 being connected to the UE 340. It should be noted that while the exemplary embodiments are generally described as the UE 340 being connected to a PCell 310 and one of either SCell 320 or 330, it may be possible for the UE to be connected to multiple SCells at the same time, e.g., connected to SCells 320 and 330 simultaneously. Thus, it should be understood that the exemplary embodiments are not limited to a single SCell connection. As will be described in greater detail below, the systems and methods for intelligent frequency selection in carrier aggregation enabled networks may be used to select the higher bandwidth cell as the PCell.

According to an exemplary embodiment described herein, a carrier may deploy a carrier aggregation configuration using two component carriers. Furthermore, the exemplary two component carrier configuration may utilize bandwidth combination supporting an aggregate maximum bandwidth greater than a threshold value for a bandwidth supported by the UE. According to one embodiment, a chipset limitation on the UE may dictate the threshold value for a maximum aggregate bandwidth for the UE. For instance, the exemplary UE 340 may be limited to support a threshold bandwidth of 20 MHz. The two CC carrier aggregation configuration may support an aggregate maximum bandwidth of 25 MHz (e.g., a 15 MHz CC and a 10 MHz CC).

In addition to the performance capabilities of the UE (e.g., the chipset limitations), a plurality of carrier configurations may pose as a potential problem for the UE. Referring back to FIG. 1, the table 100 includes the maximum aggregated bandwidths for each of the carrier configurations listed. Using the exemplary UE 340 discussed above (e.g., having a chipset limitation of 20 MHz), certain carrier aggregation configurations would be unusable by this UE. Specifically, the unusable configurations may include any configuration in which the maximum aggregated bandwidth is greater than the 20 MHz limitation of the UE 340.

Referring back to FIG. 3, it may be considered that the PCell 310 is a component carrier of 10 MHz, the SCell 320 is a component carrier of 10 MHz and the SCell 330 is a component carrier of 15 MHz. Thus, the combination of the PCell 310 and the SCell 320 results in a carrier aggregated bandwidth of 20 MHz and the combination of the PCell 310 and the SCell 330 results in a carrier aggregated bandwidth of 25 MHz. If, as described above, the capabilities of the UE 340 are limited to a threshold bandwidth of 20 MHz, then it would not be possible for the UE 340 to utilize the aggregate bandwidth of the two component carriers for the combination of the PCell 310 and the SCell 330. Instead, the UE 340 may only use either one component carrier (e.g., any one of the PCell 310, SCell 320 or SCell 330) or the aggregation of the PCell 310 and the SCell 320 to operate within its limitations. It should be understood that if the UE 340 is going to use the component carriers of either the SCell 320 or 330 as a single component carrier, these component carriers will actually be switched to be a PCell (e.g., via a handover procedure) because the UE 340 cannot be connected to an SCell without a corresponding PCell to handle the RRC and other requirements.

If the UE 340 is configured by the cellular core network 350 to use the PCell 310 having 10 MHz bandwidth, then the UE 340 will achieve only a modest throughput (e.g., 50 Mbps). However, selecting the component carrier of the SCell 330 having the 15 MHz carrier allocation as a single component carrier would be more appropriate from a performance and throughput perspective.

Figure 4:
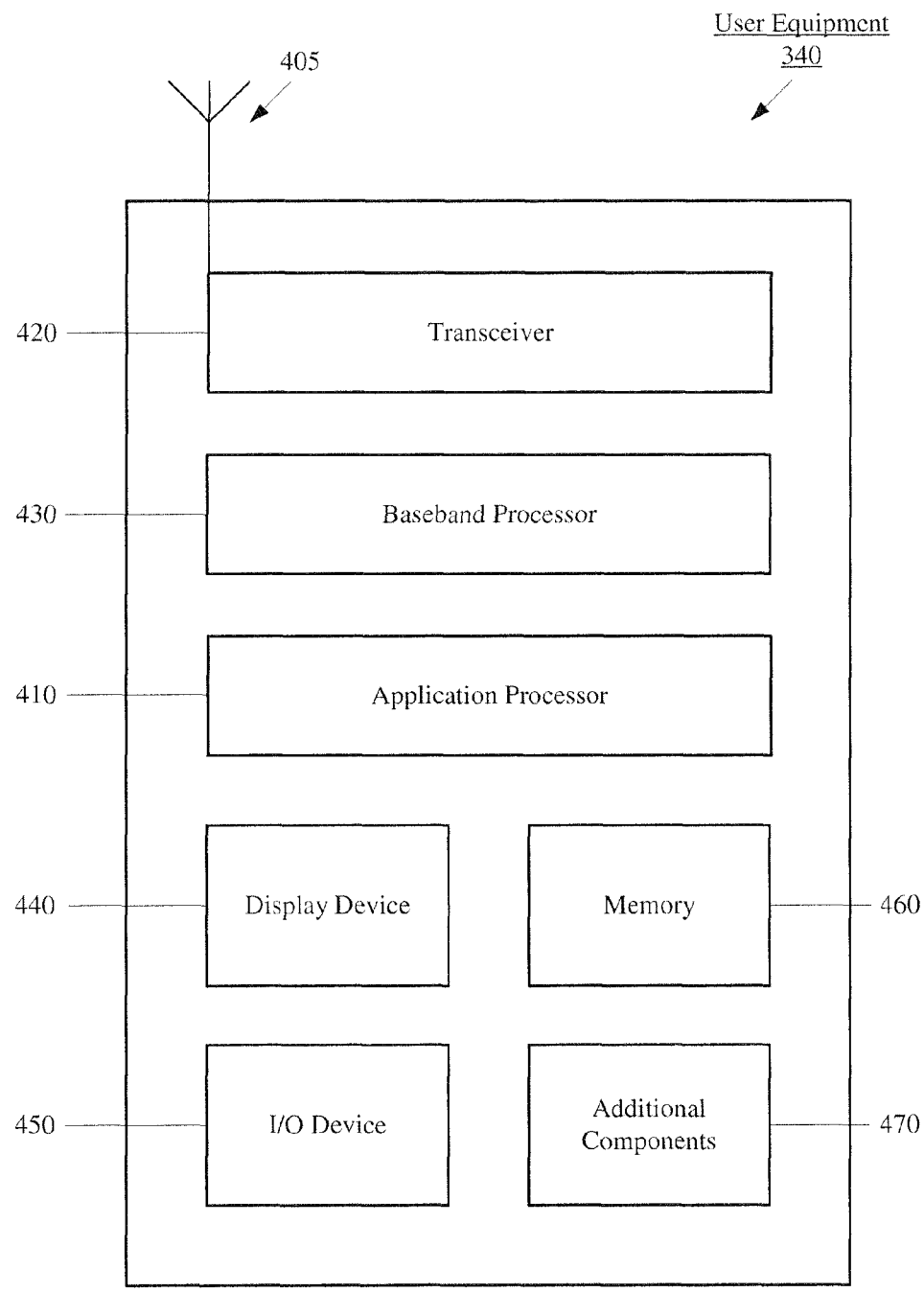
FIG. 4 shows an exemplary UE for intelligent frequency selection in carrier aggregation enabled networks.

FIG. 4 shows an exemplary UE 340 for intelligent frequency selection in carrier aggregation enabled networks according to exemplary embodiments described herein. The UE 340 may represent any electronic device that is configured to perform wireless functionalities. For example, the UE 340 may be a portable device such as a phone, a smartphone, a tablet, a phablet, a laptop, etc. In another example, the UE 340 may be a stationary device such as a desktop terminal. The UE 340 may include an antenna 405 connected to a transceiver 420, which is connected to a baseband processor 430, which is further connected to an applications processor 410. The UE 340 may further include a display 440, an I/O device 450, a memory arrangement 460 that are accessible by the baseband processor 430 or the applications processor 410. Those skilled in the art will understand that the UE 340 may also include additional components 470, for example, a Bluetooth/WiFi transceiver, further input devices (e.g., a keypad, a touchscreen, etc.), a battery, etc.

The transceiver 420 and the baseband processor 430 may be used to perform operations such as, but not limited to, scanning the network for specific radio frequency bands, exchanging information with one or more mobile switching centers, etc. It should be noted that the exemplary embodiments are described as being performed by the transceiver 420 and the baseband processor 430. However, either of these components may perform the described functionalities without the other component. In addition, other components (e.g., the application processor 410) may also perform some or all of the functionalities described herein. The application processor 410, the transceiver 420 and the baseband processor 430 may be, for example, general purpose processors, an application specific integrated circuit (ASIC), another type of integrated circuit and these processors may execute software programs or firmware.

According to one exemplary embodiment, specific carrier aggregation band combinations supported by the UE 340 may be a cause for concern based on the limitations of the UE 340. For instance, referring to the Table 100 of FIG. 1, it may be considered that the following carrier aggregation configurations and band combinations may be deemed problematic: CA_1A-18A (Band (B)1+B18); CA_3A-5A (B3+B5); CA_3A-8A (B3+B8) and CA_4A-13A (B4+B13). Those skilled in the art will understand that each of the band combinations described above are only exemplary and are merely used as an example of band combinations that may be deemed problematic. Each carrier (e.g., Verizon, AT&T, T-Mobile, etc.) may have their own problematic bands based on how the carrier has defined the particular band and carrier aggregation combinations.

Figure 5:
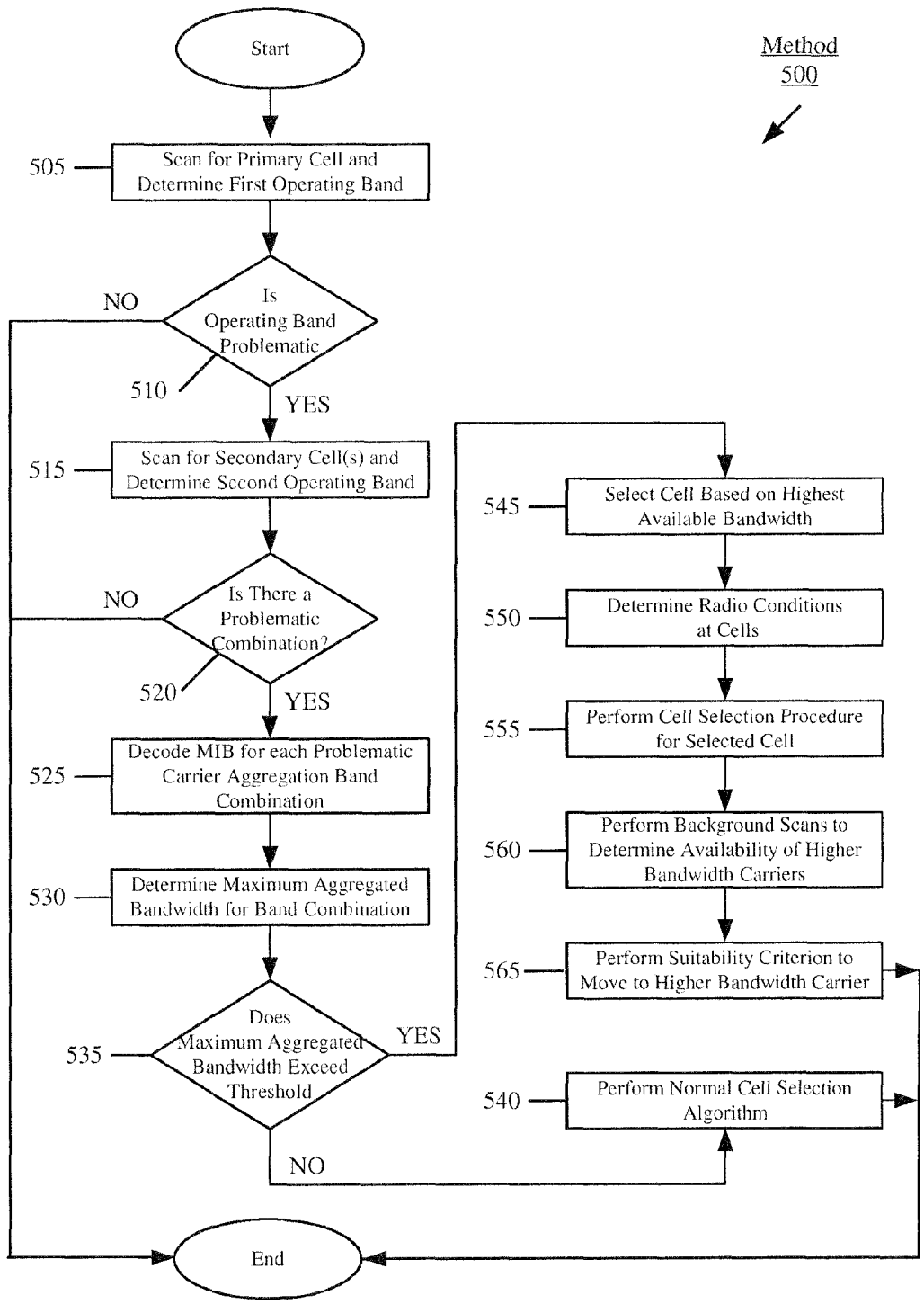
FIG. 5 shows an exemplary method for intelligent frequency selection in carrier aggregation enabled networks.

FIG. 5 shows an exemplary method 500 for intelligent frequency selection in carrier aggregation enabled networks based on system selection criteria. The exemplary method 500 will be described with reference to the exemplary arrangement 300 of FIG. 3 and the exemplary UE 340 of FIG. 4. It is noted that the UE 340 may perform the entirety of method 500. It is also noted that UE 340 is considered to be a carrier aggregation capable device.

In step 505, the UE 340 that is capable of utilizing a plurality of carrier components (e.g., a carrier aggregation enabled device) may scan for a primary cell and determine a first operating band of the primary cell in an area (e.g., B1, B2, B3, etc.). For example, the transceiver 420 in combination with the baseband processor 430 of the UE 340 may scan for the PCell 310 and determine the operating band of the PCell 310.

In step 510, the UE 340 may determine if the operating band of the PCell 310 is a problematic band. In the example described above, it was considered that the operating bands B1, B3, B4, B5, B8, B13 and B18 may have problematic combinations. Thus, using the above-described example, if the operating band of PCell 310 was one of these bands, the UE 340 would consider the band to be a problematic band. As described above, the reason the band may be considered to be problematic is that it is a band that is capable of being aggregated with another band to result in a combined carrier aggregation bandwidth that exceeds the capabilities of the UE 340. It should be noted that the UE 340 may store the information that is shown in table 100 of FIG. 1 in, for example, the memory 460 of the UE 340. This will allow the UE 340 to determine if the operating band of the PCell 310 is a problematic band. It should be noted that it is not required that table 100 be stored, but rather just an indication of the potentially problematic bands.

If it is determined in step 510 that the operating band of the PCell 310 is not problematic, then the method 500 may end because the UE 340 may use all available carrier aggregation combinations using the PCell 310 and no further steps of the method 500 need to be performed. The UE 340 may perform the normal cell selection algorithm and if carrier aggregation is enabled, use any SCells as instructed by the core network.

If the determined operating band of the PCell 310 is a band that may have a problematic combination, the method 500 will continue to step 515 where the UE 340 will scan for an underlay or overlay secondary cell and determine a second operating band of the secondary cell in the area. Thus, if the UE 340 determined that the operating band of the PCell 310 was one of the problematic bands identified in the above example, the UE 340 will scan for the underlay or overlay secondary cell (e.g., SCells 320 and 340) and determine the operating band(s) of the secondary cell(s).

In step 520, the UE 340 may determine whether the combination of the primary and secondary cells is problematic based on the combination of the first and second bands. For example, it may be determined in step 505 that PCell 310 had an operating band of B1, a possibly problematic band based on the above example, and it further may be determined in step 515 that SCell 320 had an operating band of B18. In step 520, the UE 340 will determine that the band combination of the PCell 310 and SCell 320 (B1+B18) is a potentially problematic combination. In another example, it may be determined in step 515 that SCell 330 had an operating band of B21. In step 520, the UE 340 will determine that the band combination of the PCell 310 and SCell 330 (B1+B21) is not a potentially problematic combination. If the band combination is not potentially problematic, the method 500 may end because, similar to the negative outcome of step 510, all available carrier aggregation combinations of the PCell 310 and SCell 330 may be used by the UE 340 and no further steps of the method 500 need to be performed.

However, if the result of step 520, is a potentially problematic combination, the UE 340, in step 525, may decode management information blocks ("MIB") for each carrier aggregation bandwidth combination and determine which combinations are configured to each of the plurality carrier components. It should be noted that the above-identified problematic band combinations are not definitely problems. Rather, the combinations are potential problems because they may exceed the capabilities of the UE 340. However, the mere identifying of the combination does not guarantee a problem will exist. Further information about the combination is needed to make this determination.

Thus, in step 525 the MIBs are decoded for the combination to determine certain information about the combination. One exemplary piece of information that may be included in the MIBs is the maximum aggregated bandwidth for the combination. In step 530, the UE 340 determines this maximum aggregated bandwidth for the combination.

In step 535, the UE determines if the maximum aggregated bandwidth exceeds a threshold. The threshold is based on the capabilities of the UE 340. For example, it was considered above that the maximum bandwidth capability of the UE 340 was 20 MHz. If this example is considered, then the threshold would be set at 20 MHz. If the maximum aggregated bandwidth for the band combination is less than or equal to the threshold, the method continues to step 540 where the normal cell selection algorithm is used (e.g., in LTE networks, the normal cell selection algorithm is based on the S-criterion). In other words, the potentially problematic combination of the PCell 310 and SCell 320 operating bands is not problematic for the UE 340 because the maximum aggregated bandwidth of the combination does not exceed the operating characteristics of the UE 340. To provide a specific example, the maximum operating characteristics of the UE 340 may be 25 MHz and the PCell 310 operating band may have a bandwidth of 10 MHz and the SCell 320 operating band may have a bandwidth of 15 MHz, meaning that the maximum aggregated bandwidth of the combination is 25 MHz, within the operating characteristics of the UE 340.

However, in step 535, the UE 340 may determine that the maximum aggregated bandwidth of the band combination exceeds the threshold value. If this is the case, the UE 340 cannot perform carrier aggregation using the cells because the identified cells exceed the bandwidth capabilities of the UE 340. Thus, as described above, the UE 340 will select only one of the available cells as the primary cell. The method 500 proceeds to step 545 where the UE 340 may select one of the primary and secondary cells based on the highest bandwidth between the first and second band. To provide a specific example, the PCell 310 operating band may have a bandwidth of 10 MHz and the SCell 320 operating band may have a bandwidth of 15 MHz, meaning that the maximum aggregated bandwidth of the combination is 25 MHz just as in the above example. However, in this example, the maximum operating characteristic of the UE 340 is 20 MHz, meaning that the maximum aggregated bandwidth of the band combination exceeds the operating characteristics of the UE 340. The UE 340 in step 535 would determine this and the UE would continue to step 540 where the UE 340 would select the SCell 320 as the cell having the highest available bandwidth (e.g., 15 MHz). However, this does not mean that the UE 340 will automatically perform a cell selection procedure to use the SCell 320 as the primary cell. The method will continue to perform further evaluations of the cells before the cell selection procedure is performed.

In step 550, the UE 340 may determine the radio conditions at each of the primary and secondary cells and may select one of the primary and secondary cells based on the determined radio conditions. For instance, if the RSRP/RSRQ difference (RSRPx–RSRPy<=x dbm or RSRQx–RSRQy<=y db) between the primary and secondary cells is within a certain threshold limit then the UE 340 may choose the cell with the higher bandwidth carrier. That is, while the UE 340 in step 545 will choose the carrier with the higher bandwidth as the primary cell, if the UE in step 550 determines that the higher bandwidth carrier does not meet certain signal quality standards, the UE 340 may select the lower bandwidth carrier. The method 500 will then continue to step 555 where the UE 340 will perform a cell selection procedure based on the selection as made in steps 545 and 550.

To continue with the example above, the UE 340 in step 545 would select the SCell 320 as the primary cell because it has the higher bandwidth (e.g., 15 MHz). However, if the UE 340 performing step 550 determines that the radio conditions of SCell 320 do not meet certain requirements, the UE 340 may select the PCell 310 as the primary cell and perform a cell selection procedure in step 555 to connect to the PCell 310 as the primary cell, even though the PCell 310 has a lower throughput than the SCell 320. On the other hand, if the SCell 320 radio conditions are satisfactory as determined in step 550, the UE 340 will perform a cell selection procedure to select the SCell 320 as the primary cell. As described above, when the cell selection procedure is performed to make the SCell 320, the primary cell, the SCell 320 is no longer an SCell, but is rather a PCell.

The method 500 may continue to step 560 where the UE 340 may periodically perform a background scan to determine the availability of higher bandwidth carriers. If higher bandwidth carriers are available following the background scan, and if the carrier aggregation combination is not possible for the UE 340 based on device capabilities, then in step 565 the UE 340 may use a suitability criterion to move to one of the higher bandwidth carriers. It should be understood that the determination of whether carrier aggregation combinations are possible with the higher bandwidth carrier may be performed in the same manner as described above in steps 505-535 for the higher bandwidth carrier and the currently used carrier. In addition, the suitability criterion may also be similar to the determination of the radio conditions as performed in step 550 to determine if the UE 340 should perform a cell selection procedure with the cell having the higher available bandwidth carrier.

Figure 6:
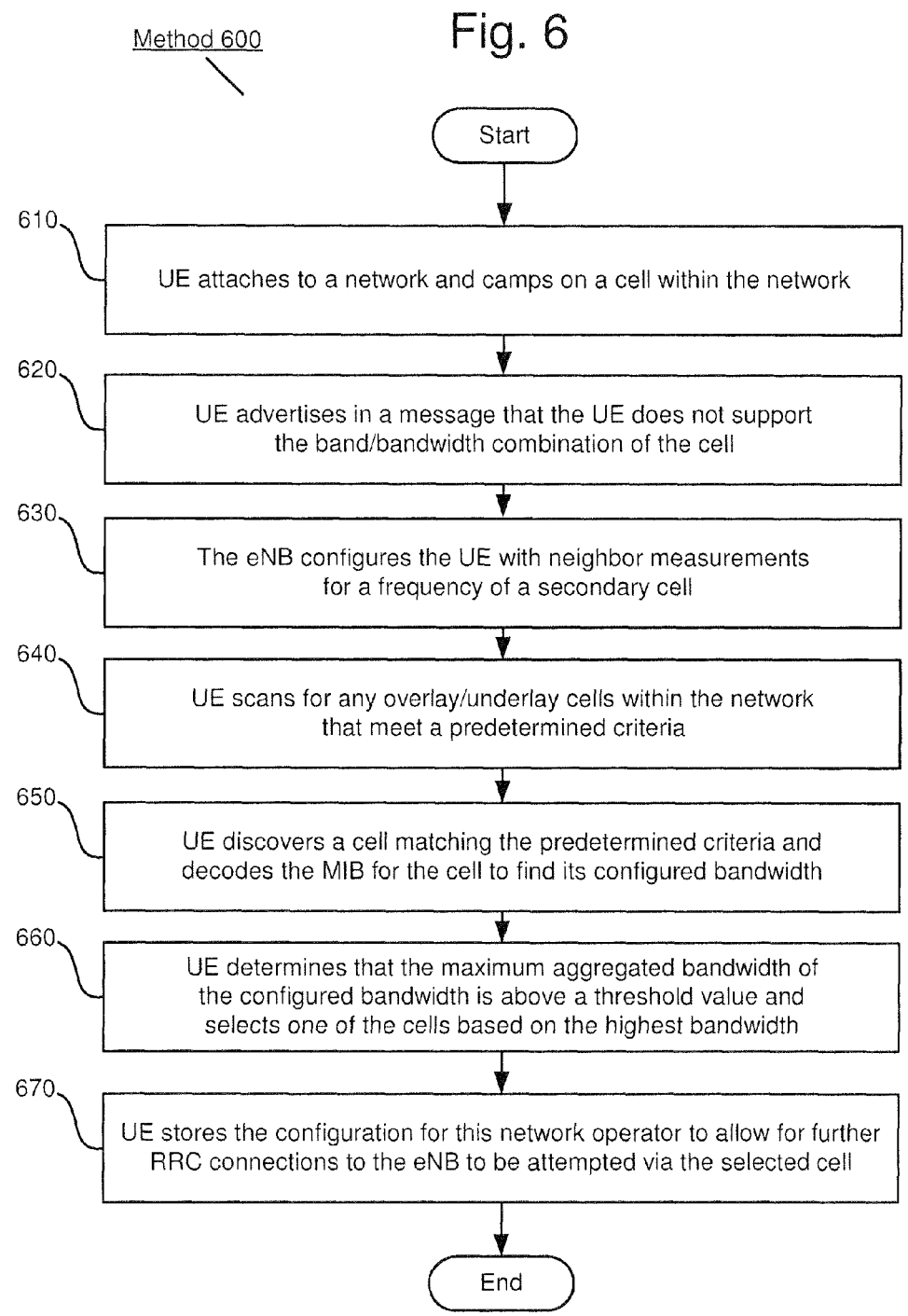
FIG. 6 shows a further exemplary method for intelligent frequency selection in carrier aggregation enabled networks.

FIG. 6 shows a further exemplary method 600 for intelligent frequency selection in carrier aggregation enabled networks based on measurement data of the network. For instance, the exemplary method 600 may utilize measurements from an SCell while in RRC_Connected state. The exemplary method 600 will be described with reference to the exemplary arrangement 300 of FIG. 3 and the exemplary UE 340 of FIG. 4. The method 600 is performed when the UE 340 attaches to a cell for the first time. Unlike the method 500 described above that may be performed entirely by the UE 340, the method 600 may include operations performed by the cellular core network 350 and/or one or more of the cells 310-330.

In step 610, the UE 340 may attach to a network and camp on a cell within the network. As described above, it is considered that this is the first time that the UE 340 has attached to this cell of the network. In this example, it may be considered that the UE 340 has camped on the PCell 310. As part of this step 610, the UE 340 being camped on the PCell 310 will know the bandwidth of the PCell 310. This known bandwidth will be used in further steps of the method.

In step 620, the UE 340 may advertise in a message (e.g., the "UE_CAPABILITY_INFO message") that the UE 340 does not support the band/bandwidth combinations with which the camped cell is configured. This does not necessarily mean that the UE 340 does not support the combinations, it is merely a default that is communicated to the cell (e.g., PCell 310) because the UE 340 may not support the combination. Thus, based on this message, the cellular core network 350 will not initially activate carrier aggregation for the UE 340. The remainder of the method 600 will determine whether carrier aggregation will be activated for the UE 340 attached to the PCell 310 and if not, which carrier the UE 340 should use in a single carrier situation.

In step 630, the cell (e.g., PCell 310) to which the UE 340 is attached may then configure the UE 340 with neighbor measurements for frequencies of secondary cell(s) (e.g., SCells 320 and 330). Those skilled in the art will understand that enhanced node Bs ("eNBs") of an LTE network communicate with neighbor cells and may have this information that may then be provided to the UE 340.

In step 640, the UE 340 may scan for any overlay/underlay cells within the network that meet a predetermined criteria, such as belonging to one of the problematic carrier aggregation pairs. For example, if it is assumed that the problematic pairs are the same as the examples described above (e.g., (B1+B18); (B3+B5); (B3+B8) and (B4+B13), the UE 340 will scan the secondary cells for these bands. That is, the UE 340 does not need to scan for all bands of the secondary cells, but rather just the bands that may be problematic.

In step 650, the UE 340 may determine that there exists a secondary cell that matches the predetermined criteria, e.g., the secondary cell may be operating on one of bands B1, B3, B4, B5, B8, B13 or B18. If this is the case, the UE 340 may then decode the MIB for the secondary cell to find its configured bandwidth.

In step 660, the UE 340 may determine the maximum aggregated bandwidth of primary cell (PCell 310) and the identified problematic secondary cell. As described above, since the UE 340 is camped on the PCell 310, the UE 340 knows the bandwidth of the PCell 310. The decoding of the MIB for the secondary cell in step 650 provides the UE 340 with the bandwidth of the secondary cell. The UE 340 may then add these two bandwidths together to determine the maximum aggregated bandwidth of the potential band combination of the PCell 310 and the identified problematic secondary cell. This step 660 may also include a comparison of the maximum aggregated bandwidth to a threshold value. This portion of step 660 is similar to the comparison described for step 545 of the method 500. For example, the threshold is the bandwidth capability of the UE 340. If the maximum aggregated bandwidth exceeds the bandwidth capability, this means the above-identified problem (i.e., the carrier aggregation bandwidth exceeds the capabilities of the UE) has been encountered. Thus, the UE 340 should not be operated in a carrier aggregation state. However, the UE 340 should still select the one of the primary and secondary cells that has the highest bandwidth. That is, the UE 340 will identify that either the primary cell (e.g., PCell 310) or the problematic secondary cell has a higher bandwidth and the UE 340 will select this cell as the primary cell.

In step 670, the UE 340 may store this configuration for this network operator and then any further RRC connections may be attempted via the cell having the larger bandwidth. In other words, the UE 340 may then use gapless inter-frequency measurements using a secondary RF unit and the pre-configured knowledge of deployed carrier aggregation band combinations to decide if this was truly a candidate secondary cell that it could not use due to limited carrier aggregation bandwidth combination support. The UE 340 may use this information in conjunction with measurement results to trigger a cell switch in connected state.

For example, as described above, the UE 340 was camped on the PCell 310 and it may be considered that the problematic secondary cell was SCell 320. If it was determined in step 660 that the maximum aggregated bandwidth exceeded the threshold, and the SCell 320 had a higher bandwidth than the PCell 310, this may cause the UE 340 to select the SCell 320 as the primary cell, rather than the PCell 310. The measurements results described above may be similar to the determination of the radio conditions as performed in step 550 of method 500. As described above, there may be instances when the higher bandwidth cell may not be selected because of the measurement results.

Alternatively, the UE 340 may use this information if the UE 340 is not mobile to camp on the secondary cell instead the next time the UE 340 creates an RRC Connection. For example, the next time the UE 340 is attempting to camp on the PCell 310, the UE 340, using the stored information, may know that the SCell 320 has a higher bandwidth capability and therefore, instead of camping on the PCell 310, the UE 340 will camp on the SCell 320. Again, when camping on the SCell 320, the SCell 320 will not be a secondary cell but will be a primary cell.

Figure 7:
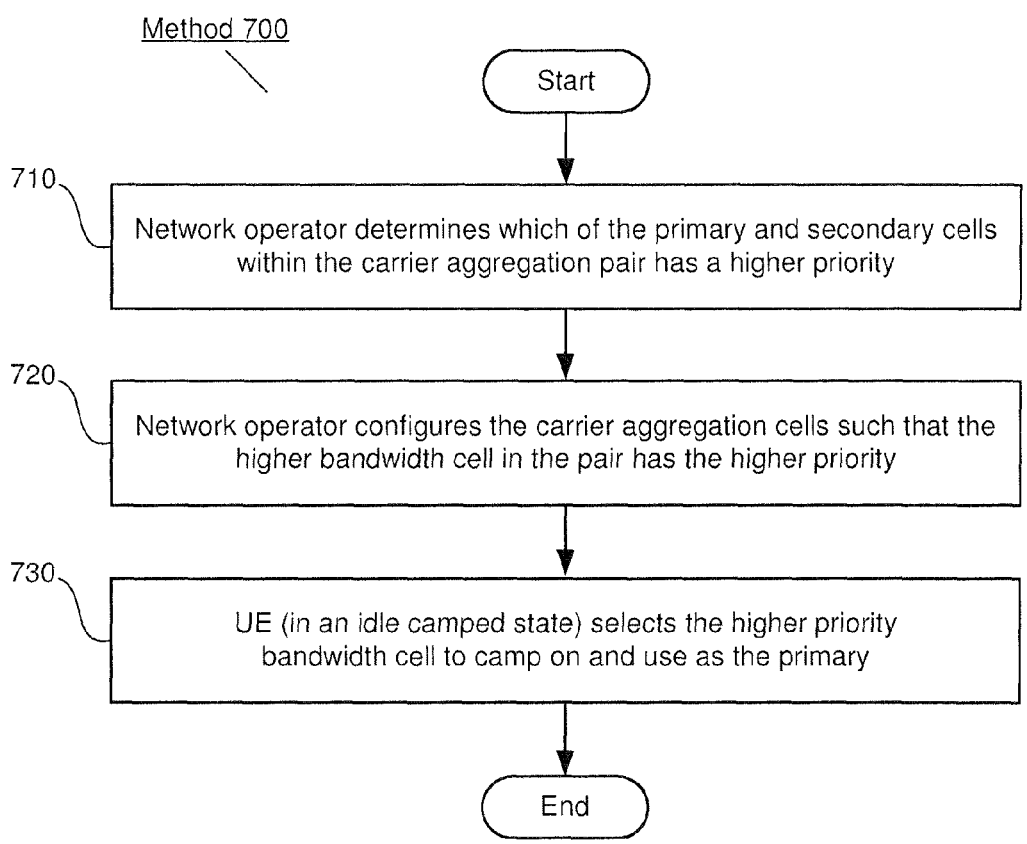
FIG. 7 shows a further exemplary method for intelligent frequency selection in carrier aggregation enabled networks.

FIG. 7 shows a further exemplary method 700 for intelligent frequency selection in carrier aggregation enabled networks based on priority levels of the carrier aggregation cells. The exemplary method 700 will be described with reference to the exemplary arrangement 300 of FIG. 3 and the exemplary UE 340 of FIG. 4.

In step 710, the network provider may determine which of a primary cell and secondary cell within a carrier aggregation pair has a higher priority based on bandwidth capabilities. For example, the network provider that operates cellular core network 350, the PCell 310, and the SCells 320 and 330 may determine the operating bands of each of these cells 310-330. The network provider may also know the carrier aggregation combinations of the cells 310-330 and which of the cells has a higher bandwidth. For example, the network provider may know that PCell 310 operates on band B1 and has a bandwidth of 10 MHz and SCell 320 operates on band B18 and has a bandwidth of 15 MHz. The network provider may also know that there is a carrier aggregation combination PCell 310 (B1) and SCell 320 (B18). Thus, the network provider will know that SCell 320 has a higher bandwidth capability than the PCell 310. This information may be stored in the cellular core network 350. For example, the cellular core network 350 may also include network servers or network databases that may store this information.

In step 720, the network operator may configure the carrier aggregation cells in such a way that the higher bandwidth cell in the pair has the higher priority. To carry on the example started above, the network provider will configure the SCell 320 to have the higher priority based on its higher bandwidth.

In step 730, the UE 340 in an idle camped state may select the higher priority bandwidth cell to camp on and use as the primary cell. That is, the network configuration will indicate to the UE 340 that when the choice for camping is between the PCell 30 and the SCell 320, the UE 340 will camp on the SCell 320 because it is the higher bandwidth cell.

The exemplary embodiments are described with reference to the LTE-Advanced carrier aggregation scheme that has certain characteristics. For example, in frequency-division duplexing ("FDD"), the characteristics include that the number of aggregated carriers may be different in DL and uplink ("UL"), typically, the number of UL component carriers is equal to or lower than the number of DL component carriers. In addition, the individual component carriers may also be of different bandwidths. Alternatively, when time division duplexing ("TDD") is used, the number of component carriers and the bandwidth of each component carrier are the same for DL and UL. However, those skilled in the art will understand that the exemplary embodiments may be applied to any carrier aggregation scheme including those having different characteristics from the LTE-Advanced scheme.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
at a user equipment ("UE"):
scanning a plurality of carrier components for a primary cell;
determining a first bandwidth of the primary cell;
scanning for a secondary cell;
determining a second bandwidth of the secondary cell;
determining a maximum aggregated bandwidth by combining the first bandwidth and the second bandwidth; and
when the maximum aggregated bandwidth exceeds a bandwidth capability of the UE, performing a cell selection procedure to select one of the primary cell or the secondary cell based on a higher of the first bandwidth and the second bandwidth.

2. The method of claim 1, wherein the UE is configured to operate in a carrier aggregation mode and wherein, in the carrier aggregation mode the UE receives signals on a first operating band of the primary cell and a second operating band of the secondary cell.

3. The method of claim 2, wherein the UE disables the carrier aggregation mode when the maximum aggregated bandwidth exceeds the bandwidth capability of the UE.

4. The method of claim 2, wherein the carrier aggregation mode is a Long Term Evolution ("LTE") carrier aggregation.

5. The method of claim 1, further comprising:
determining a first operating band of the primary cell, wherein the scanning for the secondary cell is performed after the first operating band of the primary cell is identified as one of a plurality of predetermined operating bands.

6. The method of claim 5, wherein the plurality of predetermined operating bands are operating bands that, when aggregated with further operating bands, have an aggregated bandwidth that potentially exceeds the bandwidth capability of the UE.

7. The method of claim 5, further comprising:
determining a second operating band of the secondary cell, wherein the determining the maximum aggregated bandwidth is performed after a combination of the first operating band and the second operating band is identified as one of a plurality of predetermined operating band combinations.

8. The method of claim 7, wherein the plurality of predetermined operating band combinations are operating band combinations that have an aggregated bandwidth that potentially exceeds the bandwidth capability of the UE.

9. The method of claim 1, wherein the determining the first bandwidth includes:
decoding a management information block ("MIB") for the primary cell.

10. The method of claim 1, further comprising:
when the maximum aggregated bandwidth does not exceed the bandwidth capability of the UE, performing a cell selection algorithm, wherein parameters for the cell selection algorithm is different from the cell selection procedure.

11. The method of claim 1, further comprising:
determining radio conditions of the primary cell and the secondary cell, wherein the performing a cell selection procedure is further based on the radio conditions.

12. The method of claim 1, further comprising:
performing a background scan after the cell selection procedure to identify a further cell having a higher bandwidth than the one of the primary cell or the secondary cell; and
performing a further cell selection procedure to select the further cell.

13. The method of claim 1, wherein the secondary cell is one of an overlay cell or an underlay cell.

14. A method, comprising:
at a user equipment ("UE"):
attaching to a primary cell within a network;
sending an advertisement message indicating that the UE does not support operating band combinations of the primary cell;
determining a first bandwidth of the primary cell;
scanning for a secondary cell within the network that meets a predetermined criteria;
when the secondary cell meets the predetermined criteria:
determining a second bandwidth for the secondary cell, and
determining a maximum aggregated bandwidth by combining the first bandwidth and the second bandwidth; and
when the maximum aggregated bandwidth exceeds a bandwidth capability of the UE:
determining one of the primary cell or the secondary cell that has a higher of the first bandwidth and the second bandwidth, and
storing information indicating the one of the primary cell or the secondary cell that has a higher of the first bandwidth and the second bandwidth.

15. The method of claim 14, further comprising:
receiving information from the primary cell, the information comprising neighbor measurements of frequencies of secondary cells.

16. The method of claim 14, further comprising:
performing a cell selection procedure to select the secondary cell when the information indicates the secondary cell has the higher bandwidth.

17. The method of claim 14, further comprising:
when the UE is intended to attach to the primary cell, attaching to the secondary cell when the information indicates the secondary cell has the higher bandwidth.

18. The method of claim 14, wherein the network is a Long Term Evolution ("LTE") network, the UE is a carrier aggregation enabled device and the primary and secondary cells are evolved Node B's ("ENBs") of the LTE network.

19. A integrated circuit comprising:
circuitry to scan a plurality of carrier components for a primary cell;
circuitry to determine a first bandwidth of the primary cell;
circuitry to scan for a secondary cell;
circuitry to determine a second bandwidth of the secondary cell;
circuitry to determine a maximum aggregated bandwidth by combining the first bandwidth and the second bandwidth; and
when the maximum aggregated bandwidth exceeds a bandwidth capability of a UE, circuitry to perform a cell selection procedure to select one of the primary cell or the secondary cell based on a higher of the first bandwidth and the second bandwidth.

20. The integrated circuit of claim 19, wherein the integrated circuit is configured to operate in a carrier aggregation mode and wherein, in the carrier aggregation mode the integrated circuit receives signals on a first operating band of the primary cell and a second operating band of the secondary cell.

* * * * *